(12) United States Patent
Uan-Zo-Li et al.

(10) Patent No.: US 9,564,804 B2
(45) Date of Patent: Feb. 7, 2017

(54) ELECTRONIC DEVICE HAVING PLURALITY OF VOLTAGE RAILS

(71) Applicant: INTEL CORPORATION, Santa Clara, CA (US)

(72) Inventors: Alexander B Uan-Zo-Li, Hillsboro, OR (US); Jorege P Rodriguez, Portland, OR (US); Sofia C Hao, Beaverton, OR (US); David W Browning, Beaverton, OR (US); Jeffrey A Carlson, Portland, OR (US); Tawfik M Rahal-Arabi, Tigard, OR (US); Jeffrey L Krieger, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 689 days.

(21) Appl. No.: 13/931,314

(22) Filed: Jun. 28, 2013

(65) Prior Publication Data

US 2015/0001933 A1    Jan. 1, 2015

(51) Int. Cl.
*H02M 3/158* (2006.01)
*H02M 1/36* (2007.01)
*H02M 1/00* (2006.01)
*H02J 1/00* (2006.01)

(52) U.S. Cl.
CPC ............... *H02M 3/158* (2013.01); *H02M 1/36* (2013.01); *H02J 1/00* (2013.01); *H02M 2001/008* (2013.01); *H02M 2001/0032* (2013.01); *Y02B 70/16* (2013.01); *Y10T 307/406* (2015.04)

(58) Field of Classification Search
CPC ................................. H02M 3/158; H02M 1/36
USPC ........................................................ 307/82, 31
See application file for complete search history.

(56) References Cited

U.S. PATENT DOCUMENTS

| | | | | |
|---|---|---|---|---|
| 2005/0225176 A1* | 10/2005 | Gan | .................. | H02M 3/33561 307/31 |
| 2006/0284490 A1* | 12/2006 | Kumar | .................. | H02M 3/158 307/82 |
| 2010/0026095 A1* | 2/2010 | Phadke | ................. | H02M 3/285 307/31 |
| 2010/0308661 A1* | 12/2010 | Garcia | .................... | H02J 1/102 307/80 |

* cited by examiner

*Primary Examiner* — Joseph Chang
(74) *Attorney, Agent, or Firm* — KED & Associates LLP

(57) ABSTRACT

An electronic device may include a plurality of voltage rails to provide voltages to components of a load, a plurality of voltage regulators, and a buck converter apparatus to separately couple to more than one of the plurality of voltage rails and to provide a voltage to at least a specific one of the voltage rails.

22 Claims, 8 Drawing Sheets

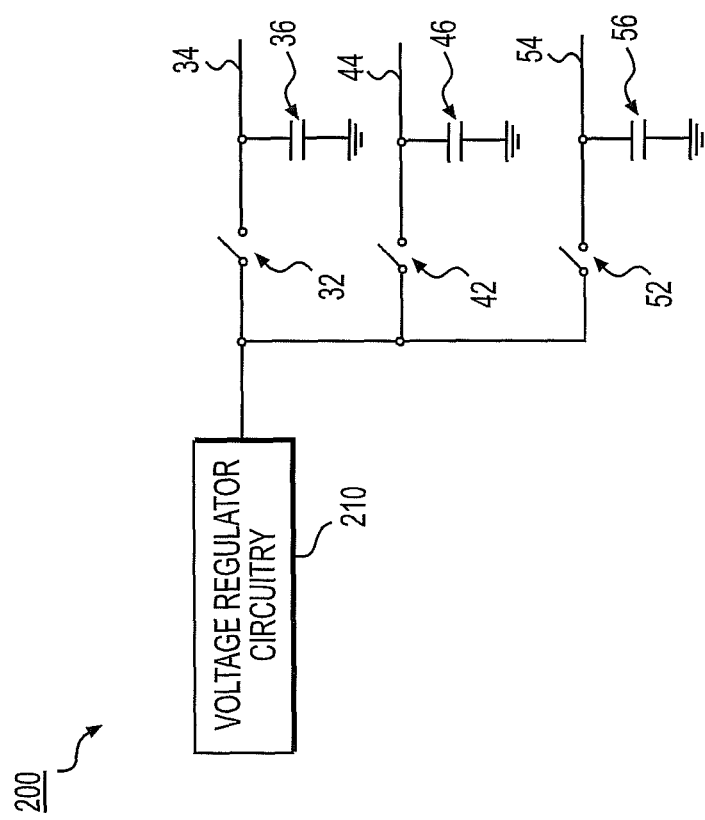

ELECTRONIC DEVICE HAVING PLURALITY OF VOLTAGE RAILS

BACKGROUND

1. Field

Embodiments may relate to an electronic device that includes a voltage regulating device having a plurality of voltage rails.

2. Background

An electronic device may operate based on a battery. However, the battery may have a limited run-time. A voltage regulator or a plurality of voltage regulators may be used to increase efficiency of battery use. The voltage regulator may need to support very high loads and/or very light loads with high efficiency.

BRIEF DESCRIPTION OF THE DRAWINGS

Embodiments and arrangements may be described in detail with reference to the following drawings in which like reference numerals refer to like elements and wherein:

FIG. 8 shows a stand-alone voltage regulator circuitry that may provide a plurality of different voltages to a plurality of voltage rails according to an example embodiment.

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

In at least one embodiment, a voltage regulating apparatus (or voltage regulator apparatus) may include a voltage regulator and a capacitor to store a voltage from the voltage regulator. In at least one embodiment, a baby buck converter apparatus may include a baby buck converter and a switch or switches to couple to voltage rails.

In at least one embodiment, a voltage regulating apparatus (or voltage regulator apparatus) may include a voltage regulator (that includes a capacitor to store a voltage). In at least one embodiment, a baby buck converter apparatus may include a baby buck converter (that includes a switch(es) to couple to voltage rail(s)).

A voltage regulator may include circuitry. A baby buck converter may include circuitry.

An electronic device may include a voltage regulator to maintain a constant voltage level.

Arrangements may utilize a baby regulator to be used when an electronic device is to operate in a light load. The baby regulator may be used rather than a voltage regulator since the baby regulator may be optimized for smaller loads and provide a very high efficiency. However, this may result in a higher cost and/or size.

Figure 1:
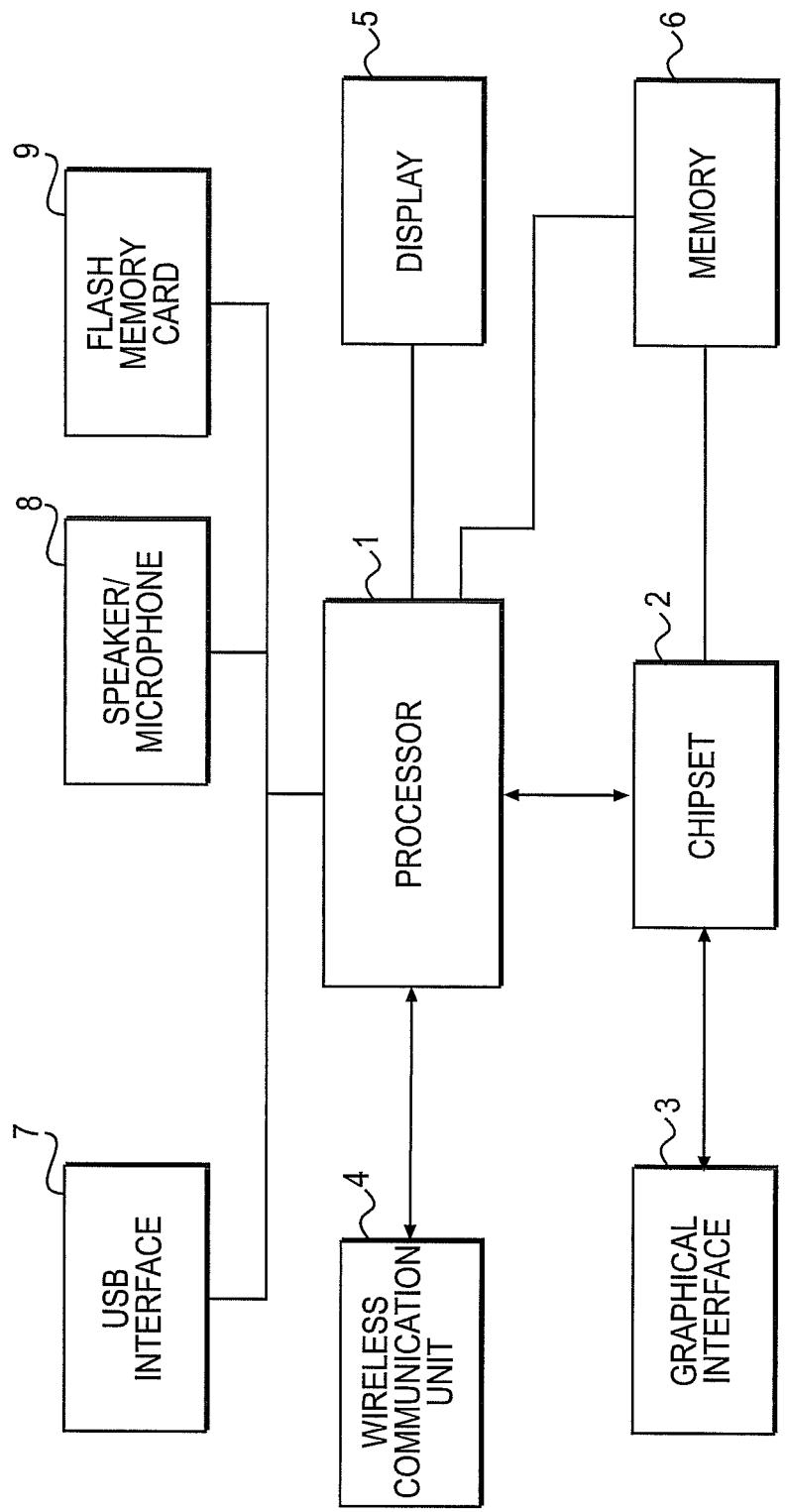
FIG. 1 shows an example of an electronic device.

FIG. 1 shows an example of an electronic device. Other configurations may also be provided.

The electronic device (or platform load) may be any one of a number of battery-powered devices, such as, but not limited to, a mobile terminal, a mobile phone, a mobile computing platform, a smartphone, a personal digital assistant, a tablet, an ultra-mobile personal computer, a mobile Internet device, a media player, and/or a laptop or notebook computer.

As shown in FIG. 1, the electronic device may include a processor 1, a chipset 2, a graphical interface 3, a wireless communications unit 4, a display 5, a memory 6, and a plurality of functional circuits including a universal serial bus (USB) interface 7, speaker and microphone circuits 8, and a flash memory card 9. A media player may also be provided. The electronic device may also include a battery. In other embodiments, a different combination or arrangements of circuits and functions may be included. Other electronic components may also be provided.

Figure 2:
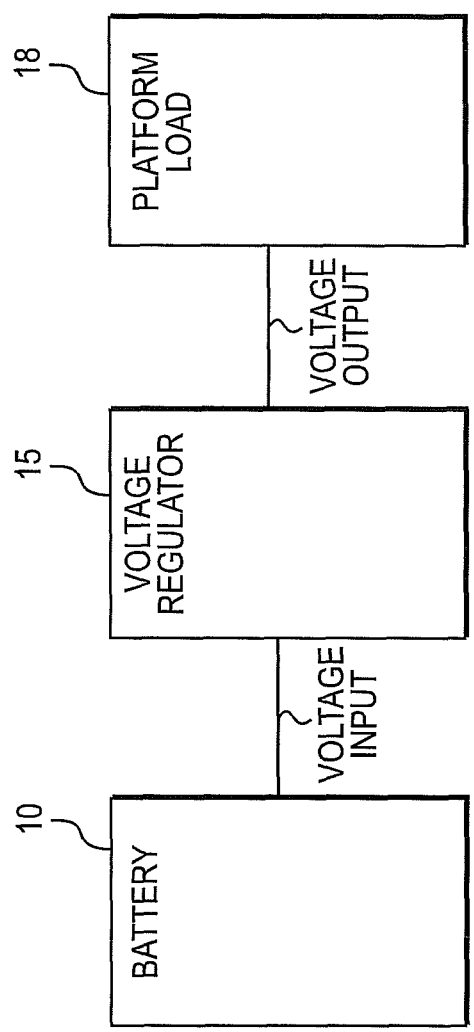
FIG. 2 shows an example of a power system for an electronic device (or platform load)

FIG. 2 shows an example of a power system for an electronic device (or a platform load). Other arrangements and configurations may also be provided. The features of FIG. 2 may also be considered an apparatus, a system and/or an electronic device.

FIG. 2 shows that a battery 10 may provide a direct current (DC) voltage (or voltage input) to a voltage regulator (VR) 15 (or a voltage regulating device). The voltage regulator 15 (or voltage regulating device) may adjust the received voltage input to a voltage output, which may then be provided to a platform load 18 (or electronic components of the electronic device). The power system may include the voltage regulator 15 (or voltage regulating device) and the battery 10. The voltage regulator 15 (or voltage regulating device) may provide a direct current (DC) voltage to the platform load 18, which may include electronic components of the electronic device.

The power system may include a plurality of voltage regulating devices (or voltage regulators) to support different voltage levels.

An alternate current/direct current (AC/DC) adaptor may convert AC voltage to DC voltage and provide the DC voltage to the battery 10 (or to a battery charger coupled to the battery 10).

Figure 3:
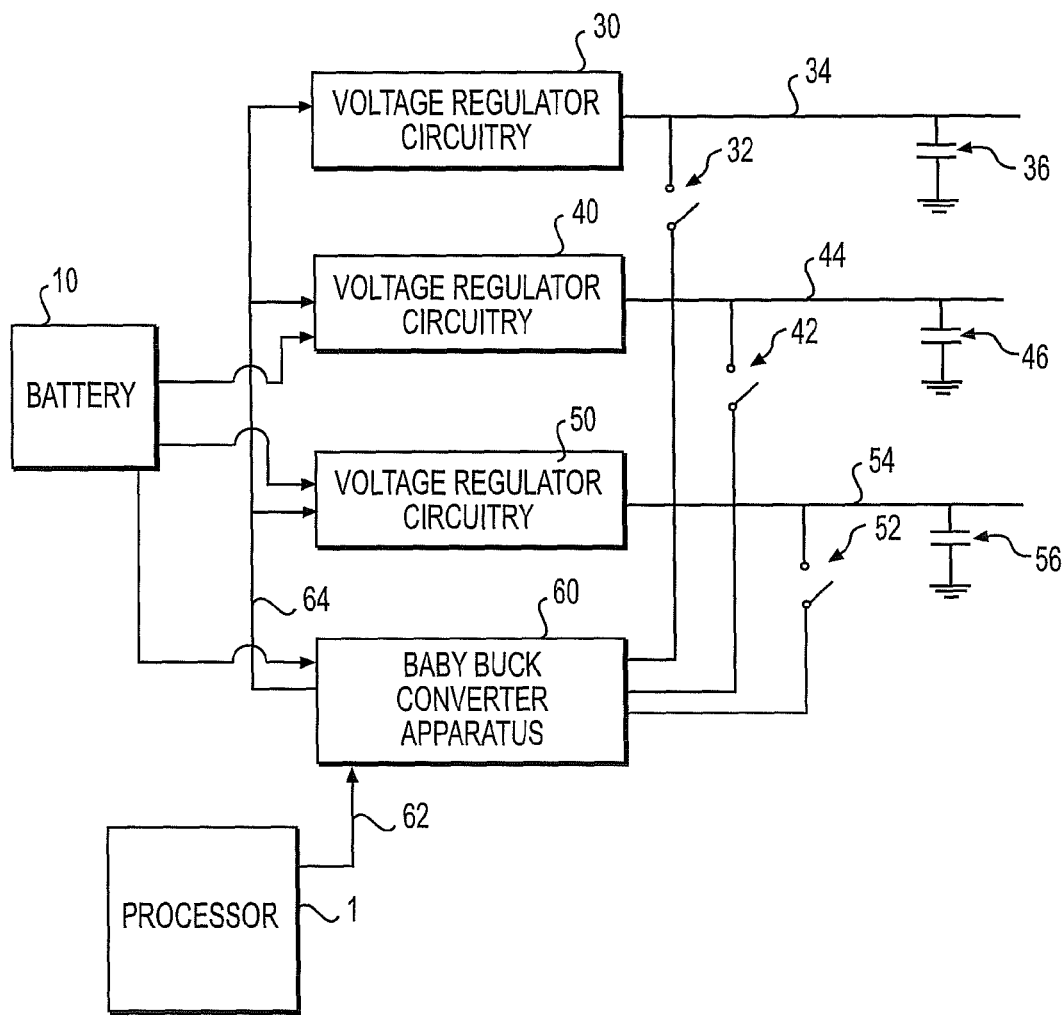
FIG. 3 shows an electronic device according to an example embodiment.

FIG. 3 shows an electronic device according to an example embodiment. Other embodiments and configurations may also be provided.

FIG. 3 shows an electronic device that includes the processor 1, the battery 10 and a plurality of voltage regulating devices. The plurality of voltage regulating devices may include a plurality of voltage regulators and a baby buck converter apparatus 60 (also referred to as a buck converter). The plurality of voltage regulators may include a first voltage regulator circuitry 30 (also referred to as the first voltage regulator), a second voltage regulator circuitry 40 (also referred to as the second voltage regulator), and a third voltage regulator circuitry 50 (also referred to as the third voltage regulator). The plurality of voltage regulating devices may include other numbers of voltage regulators.

The battery 10 may provide a direct current (DC) voltage to the respective voltage regulator circuitries 30, 40, 50 and the baby buck converter apparatus 60. The DC voltage may be provided from the battery 10 alone, from another battery, from another voltage regulator, and/or any combination of battery and voltage regulator. The battery 10 may store power, such as voltage received from an alternate current/direct current (AC/DC) converter.

Each of the voltage regulator circuitries 30, 40, 50 may include components such as a voltage controller, power switches and output capacitors, for example. As will be discussed below, each of the voltage regulators may include (or be associated with) a capacitor to store a voltage (or power). The capacitors may also be referred to as decoupling capacitors.

The circuits of the voltage regulator may include a first switch transistor and a second switch transistor, for example. The first switch transistor and the second switch transistor may each be a field effect transistor (FET). The first switch transistor and the second switch transistor may be controlled by the voltage controller of the respective voltage regulator. The voltage controller may apply signals to gates of the transistors to thereby provide an output power from the respective voltage regulator.

Additionally, the voltage regulators may provide feedback signals to the respective voltage controller so that the voltage controller may control the respective power switches, and provide an appropriate output voltage.

The processor 1 may also monitor and/or control electronic components of the electronic device. Other types of devices, such as a central processor unit (CPU), a controller or other type of control device, may monitor and/or control the electronic components of the electronic device. For example, the processor 1 may determine a respective mode of the electronic device and/or determine a specific voltage (or power) to be provided to the electronic components based on the determined mode.

FIG. 3 also shows that a baby buck converter may include the baby buck converter apparatus 60, a first switch 32, a second switch 42, and a third switch 52. Each of the switches may also be considered a switching device. In at least one embodiment, a baby buck converter may include the baby buck converter apparatus 60, which may be coupled to the switches 32, 42, 52.

Additionally, FIG. 3 shows that the plurality of voltage regulating devices may also include a first capacitor 36 (of the first voltage regulator 30), a second capacitor 46 (of the second voltage regulator 40) and a third capacitor 56 (of the third voltage regulator 50). The first, second, third capacitors 36, 46, 56 may store voltages received from the first, second, third voltage regulator circuitries, 30, 40, 50, respectively. The first, second and third capacitors may also store voltages from the baby buck converter apparatus 60. In at least one embodiment, a voltage regulator may include voltage regulator circuitry, which may be coupled to one of the capacitors 36, 46, 56, for example.

The voltage regulating device may include a first rail 34 (or first voltage rail), a second rail 44 (or second voltage rail) and a third rail 54 (or third voltage rail). The first rail 34 may be associated with the first voltage regulator circuitry 30, the first switch 32 and the first capacitor 36. The second rail 44 may be associated with the second voltage regulator circuitry 40, the second switch 42 and the second capacitor 46. The third rail 54 may be associated with the third voltage regulator circuitry 50, the third switch 52 and the third capacitor 56. Each of the rails may also be referred to as a voltage rail or a power rail. The output of each of the voltage regulator circuitries may be filtered by output decoupling of the first, second, third capacitors 36, 46, 56, respectively.

As one example, the first voltage regulator circuitry 30 may operate to provide an output voltage of 1.05 volts on the first rail 34. The second voltage regulator circuitry 40 may operate to provide an output voltage of 1.1 volts on the second rail 44. The third voltage regulator circuitry 50 may operate to provide an output voltage of 1.2 volts on the third rail 54. Other output voltages may also be provided from the respective rails.

A platform load, such as the platform load 18 (FIG. 2) may include a plurality of electronic components that operate based on different voltages and/or different modes of operation. Each of the plurality of electronic components may be coupled to one or more of the first, second, third rails 34, 44, 54. The processor 1 (or control device) may control voltages on the respective rails 34, 44, 54 such that each of the respective electronic components receives the appropriate voltage. The voltage on each of the respective rails 34, 44, 54 may change, such as during a change of state or mode of the electronic device. For example, the voltage on the respective rails may change when the electronic device enters a light load mode (or sleep mode). The determination of the change of voltage may be made by the processor 1 (or control device), for example.

The baby buck converter apparatus 60 may also be referred to as a baby buck regulator and/or a multiplexer (such as a digital multiplexer). For ease of description, the following description may refer to the baby buck converter or baby buck converter apparatus.

The baby buck converter apparatus 60 may be switchably coupled to the first rail 34 by the first switch 32. The baby buck converter apparatus 60 may be switchably coupled to the second rail 44 by the second switch 42. Additionally, the baby buck converter apparatus 60 may be switchably coupled to the third rail 54 by the third switch 52.

The baby buck converter apparatus 60 may receive a control signal 62 (or signal) from the processor 1, from a platform controller hub (PCH), an embedded controller, a control device and/or other type of digital or analog controller. The control signal may indicate (or identify) that the electronic device is in a light load condition and/or a maximum load is limited to a specified low value. The baby buck converter apparatus 60 may thereby provide a signal to the first switch 32, provide a signal to the second switch 42 and/or provide a signal to the third switch 52. The baby buck converter apparatus 60 may provide a signal to one of the switches 32, 42 and 52 and/or to more than one of the switches 32, 42 and 52. The baby buck converter apparatus 60 may provide a turn on signal or a turn off signal to each of the voltage regulator circuitries 30, 40, 50.

The baby buck converter apparatus 60 may support a plurality of voltage rails when the electronic device is in a light load mode (or state). The light load (mode) may also be called a sleep (mode), an inactive (mode), a power-down (mode), a deep power-down (mode), deep sleep (mode), low-power (mode) or idle (mode), for example.

When the electronic device enters into the light load mode (or state), then the baby buck converter apparatus 60 may receive the control signal 62 from the processor 1 (or the control device). The baby buck converter apparatus 60 may then send control signals 64 (e.g. stand-by signals such as turn-on or turn-off signals) to the respective voltage regulator circuitries 30, 40, 50. The control signals 64 may be timed such that the voltage regulator circuitries 30, 40, 50 may be shut down at appropriate times.

The baby buck converter apparatus 60 may start supporting the first rail 34, the second rail 44, and the third rail 54 in sequence. The baby buck converter apparatus 60 may thereby operate as a digital multiplexer. The first, second and third switches 32, 42, 52 may be used to isolate each of the first, second and third rails 34, 44, 54. For example, when the baby buck converter apparatus 60 is charging the output decoupling (i.e., the capacitor 36) of the voltage regulator circuitry 30, then the switch 32 may be turned on, while the switches 42, 52 are turned off. When the baby buck converter apparatus 60 is charging the output decoupling (i.e., the capacitor 46) of the voltage regulator circuitry 40, then the switch 42 is turned on, while the switches 32 and 52 are turned off. When the baby buck converter apparatus 60 is charging the output decoupling (i.e., the capacitor 56) of the voltage regulator circuitry 50, then the switch 52 is turned on, while the switches 32 and 42 are turned on.

The baby buck converter apparatus 60 and/or the processor 1 (or control device) may operate under any of a plurality of different operations. The following describes at least 3 strategies for implementing operation of the baby buck converter apparatus 60. Other strategies and operations may also be used.

The processor 1, sensor(s) and/or a control device may monitor (or determined) voltages on the first, second and third rails 34, 44, 54 (or at the first, second and third capacitors 36, 46, 56). The voltages (and/or voltage levels) may be determined and/or communicated to the baby buck converter apparatus 60 and/or the processor 1 (or control device) by a signal.

FIGS. 4A-4D show voltage, current and switch waveforms for a first strategy according to an example embodiment. Other strategies, embodiments and configurations may also be provided.

Figure 4A:
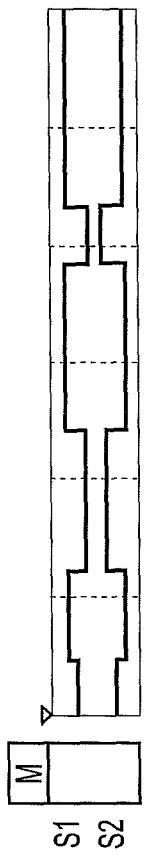
FIGS. 4A-4D show voltage, current and switch waveforms for a first strategy according to an example embodiment.
Figure 4B:
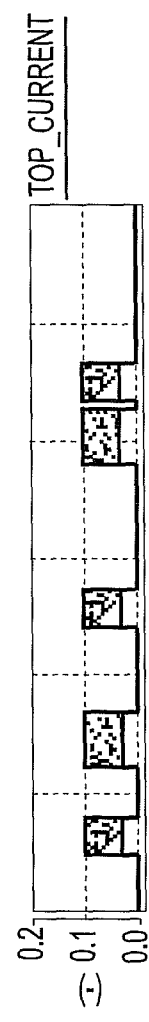
Figure 4C:
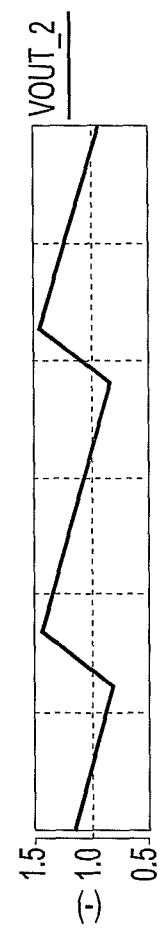
Figure 4D:
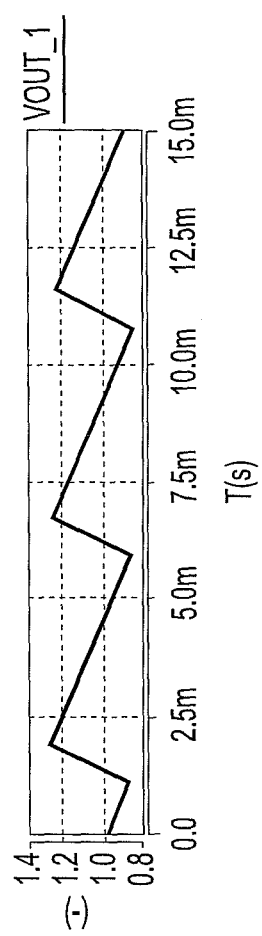

For ease of illustration, FIGS. 4A-4D only show the output waveform on two rails, such as the first rail 34 and the second rail 44 of FIG. 3. For ease of discussion and illustration, FIGS. 4A-4D do not show the output waveform on the third rail 54. FIG. 4D (and FIGS. 5-6), shows a Vout_1 waveform that represents the output voltage on the first rail 34 and FIG. 4C shows a Vout_2 waveform that represents the output voltage on the second rail 44.

FIG. 4A shows operations of the switches 32, 42 coupled to the respective rails 34, 44. More specifically, FIG. 4A shows a control signal S1 to be applied by the baby buck converter apparatus 60 to the first switch 32 coupled to the first rail 34. FIG. 4A also shows a control signal S2 to be applied by the baby buck converter apparatus 60 to the second switch 42 coupled to the second rail 44.

FIG. 4B shows a top_current waveform that represents current flowing through an inductor of the baby buck converter apparatus 60, and relates to the turning on and off of the power switches (i.e., top and bottom FETs) of the baby buck converter apparatus 60.

A description may now be provided with respect to the output voltages waveform (i.e., the graphs shown in FIGS. 4C-4D) and control signal (i.e., graph shown in FIG. 4A) waveforms.

During operation of the voltage regulating device, when a voltage on a first one of the rails decreases to a prescribed minimum value (Vmin), then the first one of the rails may be serviced by the baby buck converter apparatus 60 such that the voltage increases on the first one of the rails (and the corresponding capacitor). The increasing voltage (or charge) on the first one of the rails may stop when the voltage on the first one of the rails is equal to a maximum value (Vmax). A similar type of operation may occur regarding a second one of the rails. This may be an asynchronous operation because different ones of the rails may be serviced at different time periods. The baby buck converter apparatus 60 may control the respective voltage regulator by using the control signals 64. In at least one example, the baby buck converter apparatus 60 operates as a constant current source when the baby buck converter apparatus 60 is used to charge the output decoupling (i.e., the capacitor) of the rail that the baby buck converter apparatus 60 is servicing.

The determination of the respective voltage level of the rail, the prescribed minimum value (Vmin), and the prescribed maximum value (Vmax) may be made by the processor 1 (or control device), and/or communicated to the baby buck converter apparatus 60. In another embodiment, the determination of the respective voltage level of the rail, the prescribed minimum value (Vmin) and the prescribed maximum value (Vmax) may be made by the baby buck converter apparatus 60, or may be stored in a memory of the buck converter apparatus 60 or may be defined by external components.

FIGS. 5A-5D show voltage, current and switch waveforms for a second strategy according to an example embodiment. Other strategies, embodiments and configurations may also be provided.

Figure 5A:
FIGS. 5A-5D show voltage, current and switch waveforms for a second strategy according to an example embodiment.
Figure 5B:
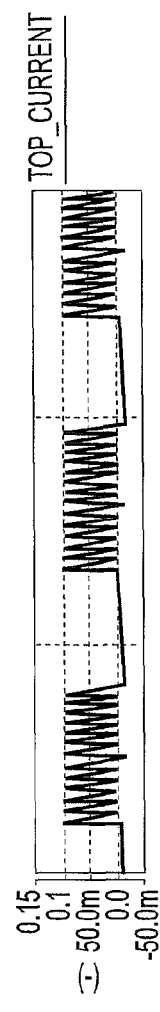
Figure 5C:
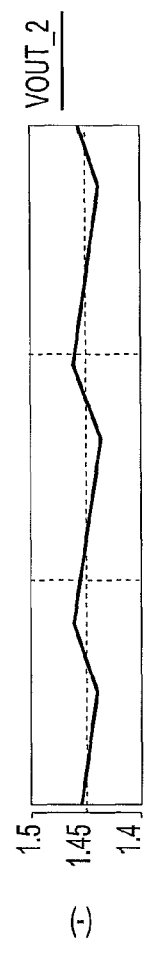
Figure 5D:
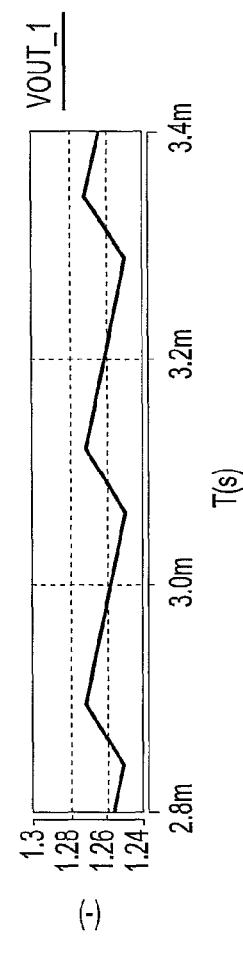

For ease of illustration, FIGS. 5A-5D only show the output waveform on two rails, such as the first rail 34 and the second rail 44 of FIG. 3. For ease of discussion and illustration, FIGS. 5A-5D do not show the output waveform on the third rail 54. FIG. 5D shows the Vout_1 waveform that represents the output voltage on the first rail 34 and FIG. 5C shows the Vout_2 waveform that represents the output voltage on the second rail 44.

FIG. 5A shows operations of the switches 32, 42 coupled to the respective rails 34, 44. More specifically, FIG. 5A shows the control signal S1 to be applied by the baby buck converter apparatus 60 to the first switch 32 coupled to the first rail 34. FIG. 5A also shows a control signal S2 to be applied by the baby buck converter apparatus 60 to the second switch 42 coupled to the second rail 44.

FIG. 5B shows the top_current waveform that represents current flowing through the inductor of the baby buck converter apparatus 60, and relates to the turning on and off of the power switches (i.e., top and bottom FETs) of the baby buck converter apparatus 60.

A description may now be provided with respect to the output voltages waveform (i.e., the graphs shown in FIGS. 5C-5D) and control signal (i.e., the graphs shown in FIG. 5A) waveforms.

During operation of the voltage regulating device, the charging of the output decoupling (i.e., the capacitor) starts with the first rail 34, which may be selected by the baby buck converter apparatus 60 (or the processor 1) based on sequence. When the voltage on the first rail 34 reaches a prescribed maximum value (Vmax), charging of the first capacitor 36 (on the first rail 34) may stop and charging of the second capacitor 46 (on the second rail 44) may start. When the voltage on the second rail 44 reaches the prescribed maximum value (Vmax), charging of the second capacitor 46 (on the second rail 44) may stop and the baby buck converter apparatus 60 may again start charging the first capacitor 36 (on the first rail 34). The baby buck converter apparatus 60 may control the respective voltage regulator by using the control signals 64. In at least one embodiment, the baby buck converter apparatus 60 operates as a constant current source when the baby buck converter apparatus is used to charge the output decoupling (i.e., the capacitor) of the rail that the baby buck converter apparatus is servicing.

The determination of the respective voltage level of the rail, the prescribed minimum value (Vmin), and the prescribed maximum value (Vmax) may be made by the processor 1 (or control device), and/or then communicated to the baby buck converter 60. In another embodiment, the determination of the respective voltage level of the rail, the prescribed minimum value (Vmin) and the prescribed maximum value (Vmax) may be made by the baby buck converter apparatus 60.

FIGS. 6A-6D show voltage, current and switch waveforms for a third strategy according to an example embodiment. Other strategies, embodiments and configurations may also be provided.

Figure 6A:
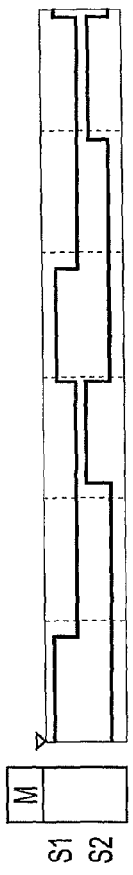
FIGS. 6A-6D show voltage, current and switch waveforms for a third strategy according to an example embodiment.
Figure 6B:
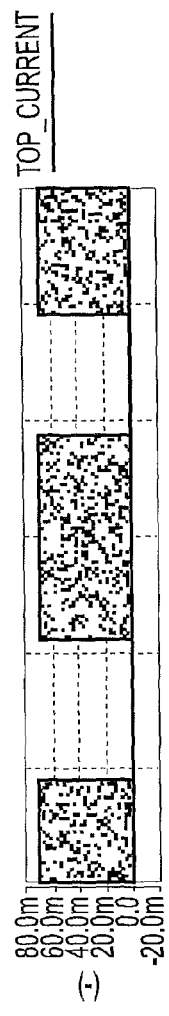
Figure 6C:
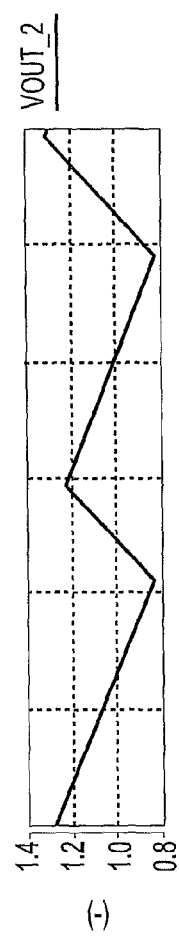
Figure 6D:
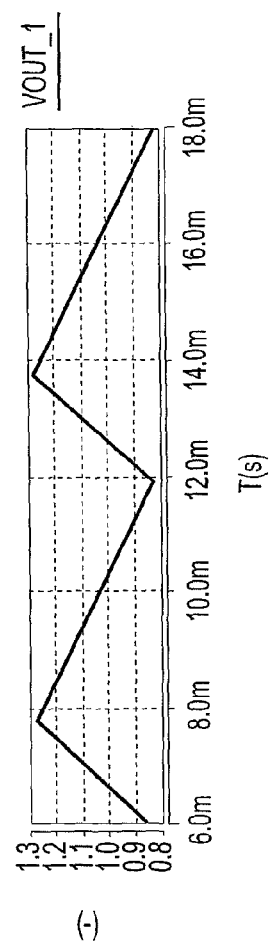

For ease of illustration, FIGS. 6A-6D only show the output waveform on two rails, such as the first rail 34 and the second rail 44 of FIG. 3. For ease of discussion and illustration, FIGS. 6A-6D do not show the output waveform on the third rail 54. FIG. 6D shows the Vout_1 waveform that represents the output voltage on the first rail 34 and FIG. 6C shows the Vout_2 waveform that represents the output voltage on the second rail 44.

FIG. 6A also shows operations of the switches 32, 42 coupled to the respective rails 34, 44. More specifically, FIG. 6A shows the control signal S1 to be applied by the baby buck converter apparatus 60 to the first switch 32 coupled to the first rail 34. FIG. 6A also shows the control signal S2 to be applied by the baby buck converter apparatus 60 to the second switch 42 coupled to the second rail 44.

FIG. 6B shows the top_current waveform that represents current flowing through the inductor of the baby buck converter apparatus 60, and relates to the turning on and off of the power switches (i.e., top and bottom FETs) of the baby buck converter apparatus 60.

A description may now be provided with respect to the output voltages waveforms (i.e., the graphs shown in FIGS. 6C-6D) and control signal (i.e., the graph shown in FIG. 6A) waveforms.

During operation of the voltage regulating device, the baby buck converter apparatus 60 may start charging the rail that reached a prescribed minimum voltage (Vmin). This charge may continue until the voltage of the rail reaches a prescribed maximum voltage (Vmax) or until another rail voltage reaches the prescribed minimum voltage (Vmin). The baby buck converter apparatus 60 may control the respective voltage regulator (or circuitry of the voltage regulator) by using the control signals 64. In at least one embodiment, the baby buck converter apparatus 60 operates as a constant current source when the baby buck converter apparatus is used to charge the output decoupling (i.e., the capacitor) of the rail that the baby buck converter apparatus 60 is servicing.

The determination of the respective voltage level of the rail, the prescribed minimum value (Vmin), and the prescribed maximum value (Vmax) may be made by the processor 1 (or control device), and/or then communicated to the baby buck converter 60. In another embodiment, the determination of the respective voltage level of the rail, the prescribed minimum value (Vmin) and the prescribed maximum value (Vmax) may be made by the baby buck converter apparatus 60.

Figure 7:
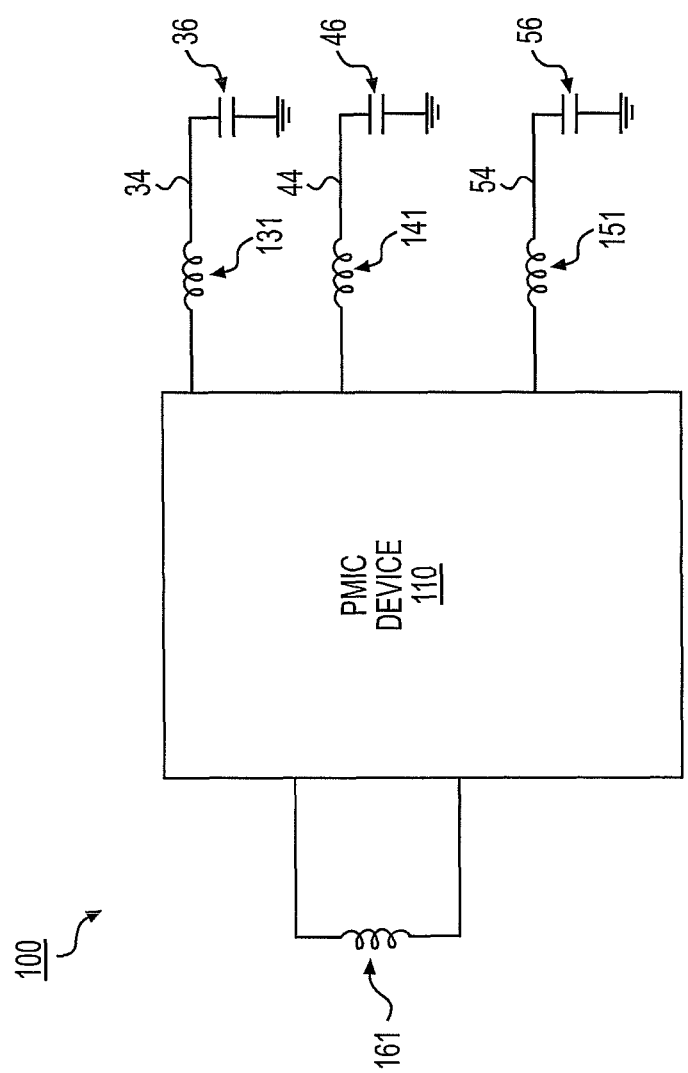
FIG. 7 shows an integrated type of voltage regulator coupled to a plurality of voltage rails according to an example embodiment.

FIG. 7 shows an integrated type of voltage regulator coupled to a plurality of rails according to an example embodiment. Other embodiments and configurations may also be provided.

More specifically, FIG. 7 shows a voltage regulating device 100 that includes a power management integrated circuit (PMIC) device 110 that may regulate voltage on the first rail 34, the second rail 44 and the third rail 54. The PMIC device 110 may include integrated transistors (such as field effect transistors (FETs)) and may be associated with discrete inductors for each of the rails 34, 44, 54. For example, the voltage regulating device 100 may include a first discrete inductor 131 for the first rail 34, a second discrete inductor 141 for the second rail 44 and a third discrete inductor 151 for the third rail 54. The first discrete inductor 131, the second discrete inductor 141 and/or the third discrete inductor 151 may be integrated inside the PMIC device 110.

When the electronic device enters into the light load mode (or similar type of mode), then the voltage regulating device 100 (including the PMIC device 110) may switch off individual voltage regulators (i.e., transistors) for the first, second, third rails 34, 44, 54, and then use an internal baby buck converter apparatus (on the PMIC device 110) with an external discrete inductor 161 to regulate all the first, second, third rails 34, 44, 54. The determination of the electronic device entering the light load mode may be made by the processor 1 (or control device), for example.

The internal baby buck converter apparatus (within the PMIC device 110) may include transistors (such as field effect transistors), which may be smaller than the transistors for each of the respective rails, while inductance of the inductor 161 may be larger than inductance of the first discrete inductor 131, the second discrete inductor 141, and the third discrete inductor 151. This mode of operation may increase the overall efficiency of the voltage conversion in a mobile platform at a minimum cost and size.

FIG. 8 shows a stand-alone voltage regulator circuitry that may provide different voltages to a plurality of rails according to an example embodiment. Other embodiments and configurations may also be provided.

FIG. 8 show a single voltage regulator circuitry 210 for supplying voltage (or power) to a plurality of loads via a plurality of rails (or voltage rails), such the first rail 34, the second rail 44 and the third rail 54. The first, second and third switches 32, 42, 52 may be used to isolate the first, second and third rails 34, 44, 54 in the light load mode(s) of the electronic device. Each of the switches 32, 42, 52 may be individually controlled by a control signal from the voltage regulator circuitry 210. The voltage regulator circuitry 210 may lower voltage levels on some of the first, second and third rails 34, 44, 54 to lower power consumptions, while other ones of the rails 34, 44, 54 may be kept at the same voltages in order to prevent loss of power, etc.

In normal operation the voltage regulator circuitry 210 may provide a first voltage, such as 1.05 volts, to the first rail 34, while in a standby mode, the voltage regulator circuitry 210 may lower the voltage on the first rail 34 to 0.6 volts while the voltage of the second rail 44 and the third rail 54 may be 1.05 volts. In non-advantageous arrangements, the switch 32 may be used as a voltage regulator or a special voltage regulator may be used to supply the first rail 34 in the light load. However, embodiments may provide the voltage regulator circuitry 210 to start operating as a multiplexer and thereby support different voltage levels for the first rail 34, and the second and third rails 44, 54. This may be done in a similar manner as discussed above with respect to the baby buck converter apparatus 60 (and/or the processor 1).

In at least one embodiment, an electronic device (or an electronic system) to provide power may comprise: a load, a plurality of voltage rails to provide voltages to components of the load, a plurality of voltage regulators to supply voltage to the plurality of voltage rails, and a buck converter apparatus to separately couple to more than one of the plurality of voltage rails and to provide a voltage to at least a specific one of the voltage rails.

The buck converter apparatus may include a plurality of switches to separately couple to more than one of the plurality of voltage rails and provide voltage to one or more voltage rails.

The buck converter apparatus to operate as a constant current source to charge one of the respective voltage rails.

The buck converter apparatus may include a plurality of power switches and an inductor to provide a voltage to one of the voltage rails.

One or more of the plurality of voltage regulators may include a first switch transistor, a second switch transistor, an inductor, and a capacitor. The capacitor to store a voltage on the corresponding voltage rail.

A control device to provide a signal to the buck converter apparatus to control the voltage on one of the voltage rails.

A control device to provide a signal to the buck converter apparatus regarding a state of the electronic device (or system).

The buck converter apparatus to provide a voltage to a decoupling capacitor coupled to the first one of the voltage rails when the voltage on the first one of the voltage rails satisfies a prescribed relationship with a prescribed voltage.

The buck converter to provide the voltage to the decoupling capacitor until the voltage on the first one of the voltage rails satisfies a prescribed relationship with a prescribed voltage.

In at least one embodiment, an apparatus may comprise: circuitry for a first voltage regulator to provide a first voltage to a first voltage rail, circuitry for a second voltage regulator to provide a second voltage to a second voltage rail, and a buck converter apparatus to switchably couple to the first voltage rail and to switchably couple to the second voltage rail.

The buck converter apparatus may include a first switch to switchably couple to the first voltage rail and a second switch to switchably couple to the second voltage rail.

The buck converter apparatus to operate as a constant current source to charge the first voltage rail.

The buck converter apparatus may include a plurality of power switches to provide a voltage to a specific one of the voltage rails.

The buck converter apparatus to receive a signal to control the voltage on a specific one of the voltage rails.

The circuitry for the first voltage regulator may include a first switch transistor and a second switch transistor.

The buck converter apparatus to receive a signal regarding a state of an electronic device.

The buck converter apparatus to charge a capacitor coupled to the first voltage rail in response to the signal.

The buck converter apparatus to provide a voltage to a capacitor coupled to the first voltage rail when the voltage on the first voltage rail satisfies a prescribed relationship with a prescribed voltage.

The buck converter apparatus to provide the voltage to the capacitor coupled to the first voltage rail until the voltage on the first voltage rail satisfies a prescribed relationship with a prescribed voltage.

The circuitry for the first voltage regulator, the circuitry for the second voltage regulator and the buck converter apparatus are integrated on the same integrated circuit.

In at least one embodiment, an electronic device (or system) may comprise: a plurality of voltage rails, a plurality of capacitors to couple to different ones of the plurality of voltage rails, respectively, a plurality of switches to couple to different ones of the plurality of voltage rails, respectively, and circuitry for a voltage regulator to provide separate voltages to the plurality of voltage rails, the circuitry for the voltage regulator to control the switches, and the circuitry for the voltage regulator to provide different voltages to a specific one of the voltage rails based on a mode of the electronic device.

A control device to provide a signal to the circuitry for the voltage regulator to control the voltage on the specific one of the voltage rails.

A control device to provide a signal to the circuitry for the voltage regulator regarding a state of the electronic device.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
   a load;
   a plurality of voltage rails to provide voltages to components of the load;
   a plurality of voltage regulators to supply voltage to the plurality of voltage rails; and
   a buck converter apparatus to separately couple to more than one of the plurality of voltage rails and to provide a voltage to at least a specific one of the voltage rails, wherein the buck converter apparatus to provide a voltage to a first decoupling capacitor coupled to a first one of the voltage rails when the voltage on the first one of the voltage rails satisfies a prescribed relationship with a first prescribed minimum voltage, and wherein the buck converter apparatus to provide the voltage to the first decoupling capacitor until the voltage on the first one of the voltage rails satisfies a prescribed relationship with a first prescribed voltage.

2. The electronic device of claim 1, wherein the buck converter apparatus includes a plurality of switches to separately couple to more than one of the plurality of voltage rails and provide voltage to one or more voltage rails.

3. The electronic device of claim 1, wherein the buck converter apparatus to operate as a constant current source to charge one of the respective voltage rails.

4. The electronic device of claim 1, wherein the buck converter apparatus includes a plurality of power switches and an inductor to provide a voltage to one of the voltage rails.

5. The electronic device of claim 1, wherein one or more of the plurality of voltage regulators includes a first switch transistor, a second switch transistor, an inductor, and a capacitor, and the capacitor to store a voltage on the corresponding voltage rail.

6. The electronic device of claim 1, further comprising a control device to provide a signal to the buck converter apparatus to control the voltage on one of the voltage rails.

7. The electronic device of claim 1, further comprising a control device to provide a signal to the buck converter apparatus regarding a state of the electronic device.

8. The electronic device of claim 1, wherein the buck converter apparatus to provide a voltage to a second decoupling capacitor coupled to a second one of the voltage rails when the voltage on the second one of the voltage rails satisfies a prescribed relationship with a second prescribed minimum voltage, and wherein the buck converter apparatus to provide the voltage to the second decoupling capacitor until the voltage on the second one of the voltage rails satisfies a prescribed relationship with a second prescribed voltage.

9. An apparatus comprising:
circuitry for a first voltage regulator to provide a first voltage to a first voltage rail;
circuitry for a second voltage regulator to provide a second voltage to a second voltage rail; and
a buck converter apparatus to switchably couple to the first voltage rail and to switchably couple to the second voltage rail, wherein the buck converter apparatus to provide a voltage to a first capacitor coupled to the first voltage rail when the voltage on the first voltage rail satisfies a prescribed relationship with a first prescribed voltage, and wherein the buck converter apparatus to provide the voltage to the first capacitor coupled to the first voltage rail until the voltage on the first voltage rail satisfies a prescribed relationship with a first prescribed voltage.

10. The apparatus of claim 9, wherein the circuitry for the first voltage regulator, the circuitry for the second voltage regulator and the buck converter apparatus are integrated on the same integrated circuit.

11. The apparatus of claim 9, wherein the buck converter apparatus includes a first switch to switchably couple to the first voltage rail and a second switch to switchably couple to the second voltage rail.

12. The apparatus of claim 9, wherein the buck converter apparatus to operate as a constant current source to charge the first voltage rail.

13. The apparatus of claim 9, wherein the buck converter apparatus includes a plurality of power switches to provide a voltage to a specific one of the voltage rails.

14. The apparatus of claim 9, wherein the buck converter apparatus to receive a signal to control the voltage on a specific one of the voltage rails.

15. The apparatus of claim 9, wherein the circuitry for the first voltage regulator includes a first switch transistor and a second switch transistor.

16. The apparatus of claim 15, wherein the buck converter apparatus to receive a signal regarding a state of an electronic device.

17. The apparatus of claim 16, wherein the buck converter apparatus to charge a capacitor coupled to the first voltage rail in response to the signal state.

18. The apparatus of claim 9, wherein the buck converter apparatus to provide a voltage to a second capacitor coupled to the second voltage rail when the voltage on the second voltage rail satisfies a prescribed relationship with a second prescribed voltage, and wherein the buck converter apparatus to provide the voltage to the second capacitor coupled to the second voltage rail until the voltage on the second voltage rail satisfies a prescribed relationship with a second prescribed voltage.

19. An electronic device comprising:
a plurality of voltage rails;
a plurality of capacitors to couple to different ones of the plurality of voltage rails, respectively;
a plurality of switches to couple to different ones of the plurality of voltage rails, respectively; and
circuitry for a voltage regulator to provide separate voltages to the plurality of voltage rails, the circuitry for voltage regulator to control the switches, and the circuitry for the voltage regulator to provide different voltages to a specific one of the voltage rails based on a mode of the electronic device,
wherein the circuitry to provide a voltage to a first capacitor coupled to a first voltage rail when the voltage on the first voltage rail satisfies a prescribed relationship with a first prescribed voltage, and wherein the circuitry to provide the voltage to the first capacitor coupled to the first voltage rail until the voltage on the first voltage rail satisfies a prescribed relationship with a first prescribed voltage.

20. The electronic device of claim 19, further comprising a control device to provide a signal to the circuitry for the voltage regulator to control the voltage on the specific one of the voltage rails.

21. The electronic device of claim 19, further comprising a control device to provide a signal to the circuitry for the voltage regulator regarding a state of the electronic device.

22. The electronic device of claim 19, wherein the circuitry to provide a voltage to a second capacitor coupled to a second voltage rail when the voltage on the second voltage rail satisfies a prescribed relationship with a second prescribed voltage, and wherein the circuitry to provide the voltage to the capacitor coupled to the second voltage rail until the voltage on the second voltage rail satisfies a prescribed relationship with a second prescribed voltage.

* * * * *